United States Patent Office
3,512,724
Patented May 19, 1970

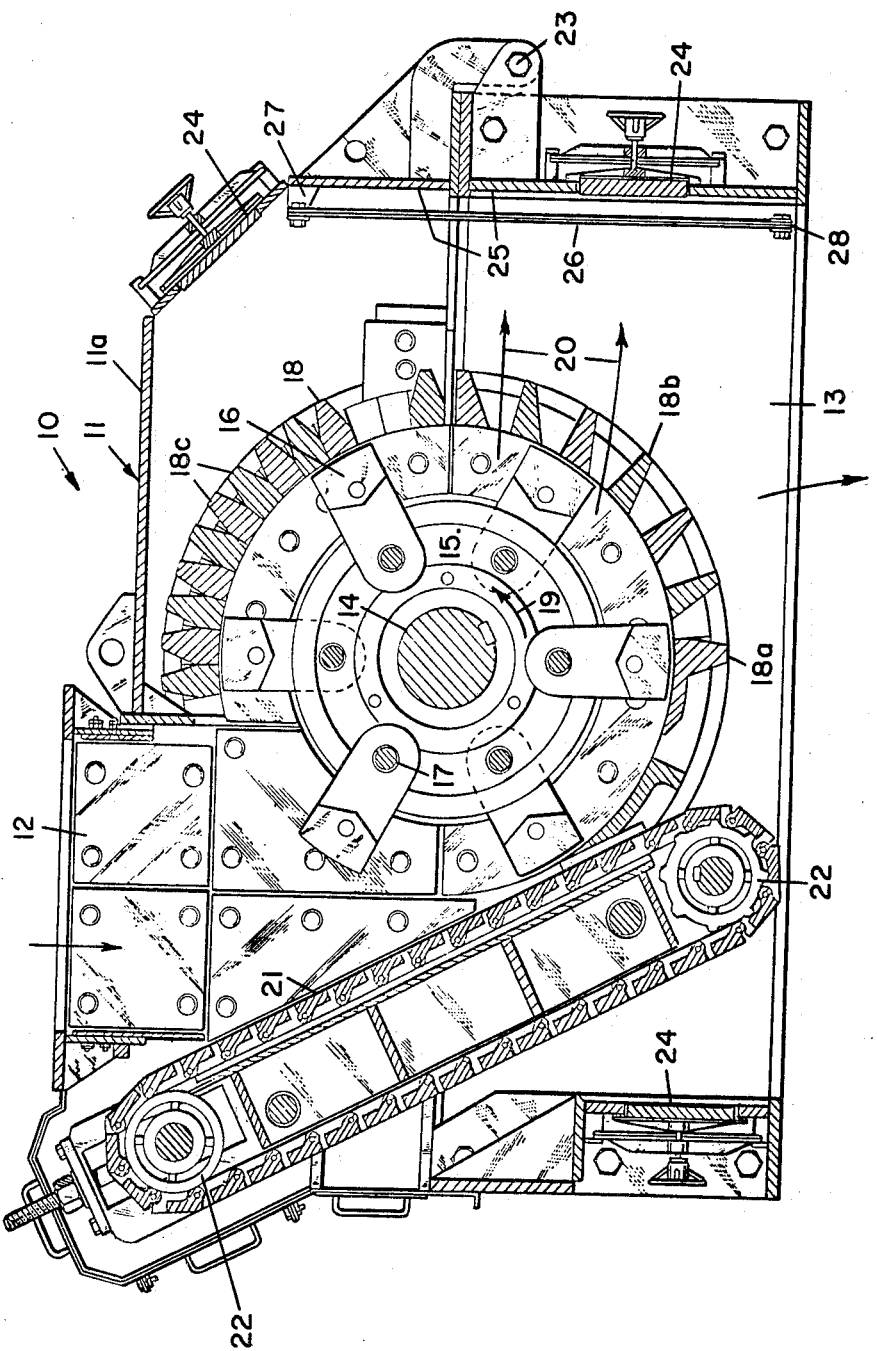

3,512,724
HAMMER MILL WITH FLEXIBLE SHIELD
Robert Lucas, Paris, France, assignor to
Fives Lille-Cail, Paris, France
Filed Aug. 1, 1967, Ser. No. 657,716
Claims priority, application France, Aug. 1, 1966,
71,640
Int. Cl. B02c 13/04
U.S. Cl. 241—86                                5 Claims

ABSTRACT OF THE DISCLOSURE

A casing containing a hammer-equipped rotor surrounded by a cooperating grill having openings through which pulverized material is discharged into the interior of the casing. A resiliently flexible shield is provided in the path of the discharged material to prevent the material from contacting and accumulating on walls of the casing. The shield is vibrated and flexed by impact of the discharged material and is thus self-cleaning.

---

This invention relates to new and useful improvements in hammer mills of the general type having a hammer-equipped rotor partially surrounded by a grill which cooperates with the rotor in pulverizing the material being milled, the grill having openings through which the pulverized material is discharged. Mills of this type usually have a casing in which the rotor and surrounding grill are contained, and when the milled material has some moisture or oil content, as for example, iron ore, potash salts, limestone, petroleum formations, et cetera, the pulverized discharge is quite sticky and rapidly accumulates on walls of the casing with the result that the mill becomes quickly clogged and its operation must be interrupted while the obstruction is removed.

The principal object of this invention is to eliminate the above outlined disadvantages, this being attained by the provision of a special shield which is positioned in the mill casing in the path of the pulverized material discharged from the grill, so as to prevent the material from contacting and accumulating upon the casing walls.

Another object of the invention is to provide a shield-equipped hammer mill wherein the shield is resiliently flexible and is subjected to vibration and flexing by impact of the material discharged thereagainst, such vibration and flexing causing the material to be shed by the shield, so that in effect the shield is self-cleaning.

Another object of the invention is to provide a shield which, although resiliently flexible for purposes of self-cleaning, is reinforced to withstand flexure fatigue and shock from impact by the discharged material, thus assuring a substantially long useful life of the shield.

With the foregoing more important objects and features in view and such other objects and features as may become apparent as this specification proceeds, the invention will be understood from the following description taken in conjunction with the accompanying drawing, wherein the single drawing figure shows a vertical sectional view of a hammer mill embodying the special shield of the invention.

Referring now to the accompanying drawing in detail, the hammer mill is designated generally by the reference numeral 10. For most part this may be more-or-less conventional in construction, comprising a suitable casing 11 provided at the top thereof with an inlet 12 for material to be pulverized and having an open bottom 13 constituting an outlet for pulverized material. A horizontal shaft 14 is rotatably journalled in the casing 11 and carries a rotor 15, including a set of hammers 16 pivoted to the rotor as at 17, the hammers assuming a radially outwardly swung position as shown, under centrifugal force when the shaft 14 is rotated.

The rotor 15 with its hammers 16 is partially surrounded by a stationary grill 18 including series of bars 18a, 18b, 18c. The bars 18a at the bottom and the bars 18b at the lower right side of the grill are spaced apart so that when the rotor is rotated in the direction of the arrow 19, material being milled is pulverized by coaction of the hammers with the grill bars and the pulverized material is discharged through openings or spaces between the bars 18b, both downwardly through the outlet 13 of the casing and also laterally as indicated by the arrow 20.

The bars 18c at the upper right side of the grill 18 are close together or in contact with virtually no space therebetween, so that discharge of material from this portion of the grill does not take place, but the bars are present for coaction with the hammers of the rotor in the material pulverizing operation. The left side portion of the rotor which is not surrounded by the grill 18 has the material inlet 12 in communication therewith and an endless apron 21 is juxtaposed to that side of the rotor in a slanting position as shown, below the material inlet 12. The endless apron 21, passing around rotatable sprocket means 22, not only serves to convey to the rotor 15 the material which is fed into the inlet 12, but it also functions as a moving anvil, so to speak, for coaction with the hammers 16 in breaking up the material prior to its pulverization in the grill 18.

Conveniently, the casing 11 may include an openable cover 11a hinged as at 23, and suitable doors 24 may be provided on the casing and cover for purposes of access to or inspection of the interior. In any event, it will be observed that the casing and cover have side wall means 25 which face the direction of discharge 20 of the pulverized material through spaces between the bars 18b of the grill 18.

The mill structure thus far described is more or less conventional and when it is in operation, the material pulverized by the hammers 16 within the grill 18 and discharged from the grill as at 20 is thrown against the wall means 25 of the casing, it being intended that such material drops off the wall means into the outlet 13. However, as a practical matter, and particularly when the pulverized material has some moisture or oil content, it is so sticky that it adheres to and accumulates on the wall means 25, with the result that the mill quickly becomes clogged and its operation must be interrupted in order for the clogged material to be removed.

The present invention eliminates this difficulty by the provision of a resiliently flexible, self-cleaning shield 26 which is positioned between the grill 18 and the wall means 25 in the path of the material discharged from the grill as at 20, so that the discharged material strikes the shield and is thereby prevented from coming in contact with and accumulating on the wall means 25.

The shield 26 is preferably disposed vertically adjacent the wall means 25, being suspended by its upper edge from a suitable support 27 provided on the wall means, preferably on that portion of the wall means associated with the cover 11a of the casing, so that when the cover is opened, the shield is withdrawn from the lower portion of the casing itself.

The shield is formed from resiliently flexible material such as sheet rubber, either natural or synthetic, or elastic fabric may be used. Preferably, the material of the shield is suitably reinforced against flexure fatigue and also to withstand shock by continuous impact of the pulverized material discharged from the grill 18 against the shield, so that a substantially long useful life of the shield is assured. Reinforcing of the shield may be attained in any suitable manner, as for example, by forming the shield integrally with reinforcing ribs, or by embedding reinforcing rods or bars within the thickness of the shield, or the like. Also, the lower edge of the shield is preferably weighted and reinforced by a stiffener 28, the inertial effect of which has a tendency to resist swinging or displacement of the shield by impact of the pulverized material thereagainst.

However, it is to be noted that although the shield 26 is reinforced as already mentioned, it is resiliently flexible to the extent that when the pulverized material discharged from the grill 18 as at 20 impacts against the shield, the latter is subjected to vibration, flexing and twisting. As a result, although the discharged material may be sticky, it does not have an opportunity to adhere to and accumulate on the shield, but is quickly shed by the shield and drops downwardly through the outlet 13 of the casing 11, the shield being disposed above the outlet, as shown. In this manner the shield is effectively self-cleaning, and since there is no accumulation of the discharged material on the shield or on the wall means 25, clogging does not occur and the mill is capable of continuous operation without interruptions for cleaning.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a hammer mill, the combination of a casing, a rotor mounted in said casing for rotation in a predetermined direction about a horizontal axis, said rotor including a set of hammers, a stationary grill at least partially surrounding said rotor and cooperating with said hammers to pulverize material which is being milled, said grill having openings through which pulverized material is discharged mainly from the lower portion of the grill below the axis of rotation of said rotor, said casing including wall means facing the direction of material discharge through said grill openings, support means provided in said casing in upwardly spaced relation from said axis of rotation, and a vertical self-cleaning shield of flexible material suspended by its upper edge from said support means with the upper end portion of the shield being disposed above and the lower end portion of the shield being disposed below said axis of rotation, said shield being located between said grill and said wall means of the casing in the path of the discharged material whereby to prevent the latter from contacting and accumulating on said wall means, said flexible shield being subjected to vibration and flexing by impact of the discharged material whereby to render the shield self-cleaning.

2. The mill as defined in claim 1 wherein said casing has a material outlet at the bottom thereof, said self-cleaning shield being positioned above said outlet whereby material shed by the shield may drop through the outlet.

3. The mill as defined in claim 1 together with a stiffening member provided at the lower edge of the suspended shield.

4. The mill as defined in claim 1 wherein said shield is formed from resiliently flexible rubber-like material.

5. The mil as defined in claim 1 wherein said shield is formed from resiliently flexible but reinforced rubber-like material.

References Cited

UNITED STATES PATENTS

| | | | |
|---|---|---|---|
| 1,788,388 | 1/1931 | Frickey | 241—86 |
| 2,115,997 | 5/1938 | Morse. | |
| 2,463,631 | 3/1949 | Knight | 241—187 X |
| 2,523,004 | 9/1950 | Fowler | 241—187 |
| 2,658,603 | 11/1953 | Fernald. | |
| 2,919,074 | 12/1959 | Doyle. | |

FRANK T. YOST, Primary Examiner

U.S. Cl. X.R.

241—102, 186